US009582874B2

(12) United States Patent
Davies et al.

(10) Patent No.: US 9,582,874 B2
(45) Date of Patent: Feb. 28, 2017

(54) METHOD OF DETECTION OF FAULTS ON CIRCUIT BOARDS

(71) Applicants: Alexander Phillip Davies, Duncraig (AU); Kevin Stephen Davies, Duncraig (AU)

(72) Inventors: Alexander Phillip Davies, Duncraig (AU); Kevin Stephen Davies, Duncraig (AU)

(*) Notice: Subject to any disclaimer, the term of this patent is extended or adjusted under 35 U.S.C. 154(b) by 80 days.

(21) Appl. No.: 14/647,404

(22) PCT Filed: Nov. 22, 2013

(86) PCT No.: PCT/AU2013/001354
§ 371 (c)(1),
(2) Date: May 26, 2015

(87) PCT Pub. No.: WO2014/078906
PCT Pub. Date: May 30, 2014

(65) Prior Publication Data
US 2015/0294456 A1 Oct. 15, 2015

(30) Foreign Application Priority Data

Nov. 23, 2012 (AU) .............................. 2012905111
Dec. 6, 2012 (AU) .............................. 2012905318

(51) Int. Cl.
*G06T 7/00* (2006.01)
*G06T 1/00* (2006.01)

(52) U.S. Cl.
CPC ........... *G06T 7/0008* (2013.01); *G06T 1/0007* (2013.01); *G06T 7/001* (2013.01); *G06T 7/0024* (2013.01);
(Continued)

(58) Field of Classification Search
CPC .................... G06T 1/0007; G06T 2207/10004; G06T 2207/10024; G06T 2207/20021; G06T 2207/20221; G06T 2207/30141; G06T 7/0008; G06T 7/001; G06T 7/0024; G06T 7/0081; G06T 2207/30148; G06T 2207/20076; G06T 7/0028; G06F 17/5045; G06F 17/5081; G06F 11/263; G01R 31/2894
See application file for complete search history.

(56) References Cited

U.S. PATENT DOCUMENTS

| | | | |
|---|---|---|---|
| 6,434,264 B1* | 8/2002 | Asar ................ | G01N 21/95607 382/147 |
| 7,149,342 B2* | 12/2006 | Biazik .............. | G01N 21/95607 382/148 |
| 7,643,703 B2* | 1/2010 | Jones ................... | G06T 7/0028 382/294 |

* cited by examiner

*Primary Examiner* — Kim Vu
*Assistant Examiner* — Michael Vanchy, Jr.
(74) *Attorney, Agent, or Firm* — Tope-McKay & Associates

(57) ABSTRACT

A method of detection of faults on circuit boards comprising the steps of capturing an image (14) of each of a plurality of circuit boards (10) and dividing each of the captured images (14) into a plurality of image segments, each having an image characteristic value. One of the circuit boards 10 is selected for testing and each image segment is compared with corresponding image segments of each other circuit boards (10) to define a plurality of differential image characteristic values. The differential image characteristic values for each image segment are ranked from lowest to highest and an $n^{th}$ differential image characteristic value is selected. An overlay image comprising a representation of the selected differential image characteristic values is created and displayed over the selected circuit board.

20 Claims, 6 Drawing Sheets

(52) U.S. Cl.
CPC ... *G06T 7/0081* (2013.01); *G06T 2207/10004* (2013.01); *G06T 2207/10024* (2013.01); *G06T 2207/20021* (2013.01); *G06T 2207/20221* (2013.01); *G06T 2207/30141* (2013.01)

METHOD OF DETECTION OF FAULTS ON CIRCUIT BOARDS

FIELD OF THE INVENTION

The present invention relates to a method for detection of faults on circuit boards.

BACKGROUND TO THE INVENTION

During production of circuit boards, various circuit components are placed onto the board and then soldered in place. It is possible at various stages of the process for faults to occur in relation to some of these circuit components. For example, components may not be properly grasped by the machinery which places them on the circuit board and may therefore be missing. Components may also move from the correct position prior to or during soldering such that the components are not properly connected.

It is of course desirable to identify such faults. Visual inspection may be used to identify such issues, however when looking at a large number of components across many boards, it is possible that some faults may not be detected. The fact that a fault exists is likely to be detected by incorrect operation of the board but the process of testing and identifying faults from this paint can be time consuming.

The present invention relates to a method for identifying potential faults on circuit boards in a manner which is relatively quick and efficient.

SUMMARY OF THE INVENTION

According to one aspect of the present invention there is provided a method of detection of faults on circuit boards comprising the steps of:
   capturing an image of each of a plurality of circuit boards;
   dividing each of the captured images into a plurality of image segments;
   defining an image characteristic value for each image segment;
   selecting one of the circuit boards for testing;
   comparing each image segment from the selected circuit board with corresponding image segments of each other circuit board and defining for each image segment a plurality of differential image characteristic values, each being the difference between the image characteristic value of the image segment of the selected circuit board and the image characteristic value of one of the other circuit boards;
   ranking some or all of the differential image characteristic values for each image segment from lowest to highest;
   selecting an $n^{th}$ differential image characteristic value for each image segment; and
   creating a map from the selected differential image characteristic values providing information about locations on the circuit board where faults may exist.

Preferably the method comprises the further steps of:
   forming an overlay image from the map, the overlay image comprising a representation of the selected differential image characteristic values of each of the image segments; and
   displaying the selected circuit board overlaid with the overlay image.

Preferably the method includes the step of selecting the $n^{th}$ differential image to be greater than the first differential image characteristic value.

Preferably the image segments comprise pixels or blocks of a plurality of pixels of the image.

In one embodiment, the image characteristic value comprises the brightness of the image segment.

In one embodiment, the number of differential image characteristic values ranked is less than the number of circuit boards.

Preferably the overlay image is formed of image segments of a selected colour wherein the intensity of each segment is related to the corresponding differential image characteristic value.

In a preferred embodiment, the overlay image is modified to reduce the intensity in areas where only a small number of image segments are visible. In one embodiment, the overlay image is blurred.

Preferably image segments of the overlay image are expanded after blurring to increase the visibility of visible image segments.

In a preferred embodiment, an image alignment procedure is utilised in order to align each part of the captured image of a circuit board with corresponding parts of the other images before determination of the differential image characteristic values.

Preferably the image alignment procedure for each circuit board comprises comparing the image against a preselected image of a circuit board of the same type, moving the image through a plurality of positions and comparing to the preselected image each time until a position is determined in which the image is most similar to the preselected image.

Preferably the image is further divided into a plurality of sub-portions corresponding to sub-portions of the preselected image and for each sub-portion, the image alignment procedure is repeated.

In a preferred embodiment, the method of the invention is performed by software on a computer having a display and a user input device.

Preferably the software provides for selection of a part of the circuit board where a potential fault area exists with the input device to display a zoomed display area in which the overlay image is removed.

Preferably the zoomed display area comprises an image which alternates between displaying the circuit board and displaying an image of a corresponding part of another circuit board.

In one embodiment, the software provides one or more controls which can be operated by the user to annotate potential fault areas. The annotations may comprises critical and non-critical faults.

BRIEF DESCRIPTION OF THE DRAWINGS

The invention will now be described, by way of example, with reference to the following drawings, in which.

DETAILED DESCRIPTION OF PREFERRED EMBODIMENTS

The invention relates to a method of detecting faults or potential faults in a circuit board 10. The method is applied to each circuit board 10 of a plurality of circuit boards 10. Each circuit board 10 includes a plurality of components which are soldered to the circuit board 10.

An image 14 of each circuit board 10 is captured and stored on a suitable processing device, such as a personal computer, as an image file. The method of the invention utilises a comparison of parts of the captured image 14 of a circuit board 10 with corresponding parts of the captured images 14 of the other circuit boards 10. The method of the invention is performed by software provided on a suitable computing device.

In order to make the abovementioned comparison, an image alignment procedure is first utilised in order to generally align each part of the captured image 14 of a circuit board 10 with corresponding parts of the other images 14.

The image alignment procedure for each circuit board 10 comprises first comparing the image 14 against a preselected image of a circuit board 10 of the same type. The image 14 is then moved through a plurality of positions and compared to the preselected image 15 each time. In each position, the image 14 is compared to the preselected image until a position is determined in which the image 14 is most similar to the preselected image.

The image 14 of the circuit board 10 is then divided into a plurality of sub-portions corresponding to sub-portions of the preselected image. For each sub-portion, the image alignment procedure described above is repeated. That is, each sub-portion is moved through a plurality of positions and compared to the corresponding sub-portion of the preselected image. The sub-portions are then left in the positions determined to be most similar to the sub-portions of the image of the preselected circuit board.

The sub-portions may comprise rectangular sub-portions, each to be moved to best align with the preselected image. Alternatively, triangular sub-portions may be formed, with the corners of the triangles moved to align the images.

This image alignment procedure may be further refined by dividing each sub-portion into further sub-portions and repeating the procedure. Once finalised, the position of each component on the image 14 of the selected circuit board 10 is relatively close to that of the image of the preselected circuit board 10. This process will correct for general positioning changes of components on circuit boards 10 that may occur during production. For example, if a top row only of components on the circuit boards 10 moves over the course of a production run, these components on the image 14 will all be aligned by the image alignment process.

Once the images 14 of each of the circuit boards 10 are aligned, each image is broken into a plurality of image segments. The image segments are preferably pixels of the image but may comprise blocks of a plurality of pixels.

For each circuit board 10, the method of detection of faults comprises a plurality of steps provided to create map which contains information on locations on the circuit board 10 where potential faults exist. In the embodiment described, the map is displayed as an overlay image 20. The overlay image 20 can be displayed with an image of the circuit board 10 and provides a representation of differences in the image segments of the image of the circuit board 10 and corresponding image segments of the other circuit boards 10.

The method is based on the concept that most circuit boards 10 will be without faults. Therefore, each image segment will generally appear the same as corresponding image segments on other circuit boards 10. If an image segment appears different to corresponding image segments on other circuit boards 10, then this is an indication that the component 12 at that location is in some manner different to the other boards and therefore the likelihood of a fault exists.

For a selected circuit board 10 therefore each image segment is compared to corresponding image segments of the other circuit boards 10. The comparison is based on an image characteristic value of the image segment. The image characteristic value may, for example, be a numerical representation of the brightness of the image segment. The image characteristic value of each image segment is compared to the image characteristic value of the corresponding image segment on each other board and a plurality of differential image characteristic values, being the difference in the compared image characteristic values, result. These differential image characteristic values are ranked from lowest to highest (i.e. from the image segment of the circuit board 10 which is the closest to the selected circuit board to the image segment of the circuit board 10 which is most different). In practice, not all of the differential image characteristic values may be ranked. For example, only the lowest x differential image characteristics may be ranked to save processing time, x being less than the number of circuit boards 10.

An $n^{th}$ differential image characteristic value is then selected. The $n^{th}$ differential image characteristic value may, for example, be the first. That is, the differential image characteristic value formed by the comparison to the circuit board which is most similar at that image segment. Preferably though, the $n^{th}$ is chosen to be greater than the first differential image characteristic value. For example, the differential image characteristic value resulting from the comparison with the image segment which is the second closest to the image segment on the circuit board 10 being considered. The selection of the second differential image characteristic value is expected to reduce the likelihood of a fault being missed due to a single repetition of the same fault across two different circuit boards 10.

The overlay image 20 is then formed from the selected differential image characteristic values. That is, the overlay image 20 for a selected circuit board 10 is made up of the same number of image segments as the image 14 of the circuit boards 10, where each image segment is a representation of the corresponding differential image characteristic value selected for that circuit board 10. Each segment of the overlay image 20 may comprise a particular colour having an intensity related to the selected differential image characteristic. Therefore, the overlay image 20 will show the particular colour on the circuit board 10 where the image 14 differently from that of the other circuit boards 10.

The overlay image 20 is modified to reduce the intensity in areas where only a small number of image segments are visible. The overlay image 20 may, for example, be blurred.

The action of blurring spreads out unwanted noisy spots of light. Image segments are also expanded after blurring to make them more visible after blurring has reduced the brightness of unwanted light. The colour of the image overlay image 20 is selected to be a colour which would not be found generally on the images 14 of the circuit boards 10. The overlay image 20 may, for example, be coloured red.

Figure 1:
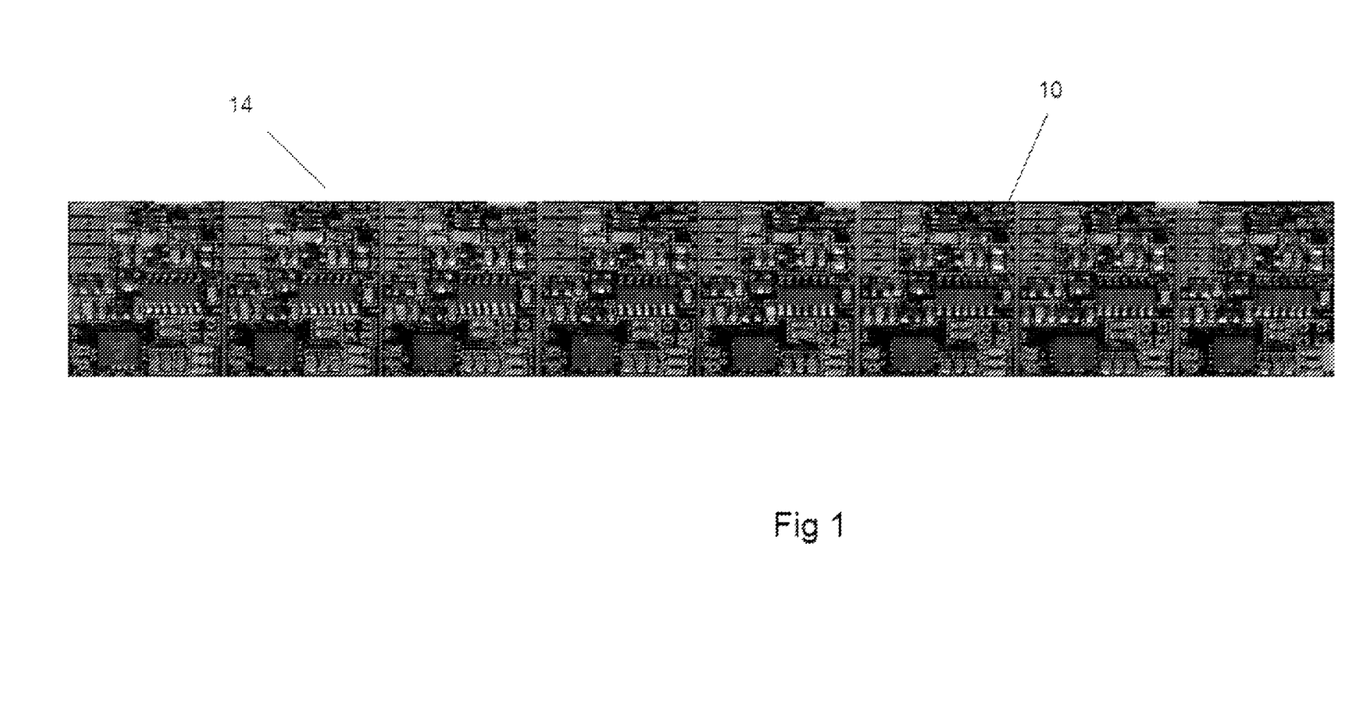
FIG. 1 is a captured image of a circuit board to which the method of the present invention may be applied.
Figure 2:
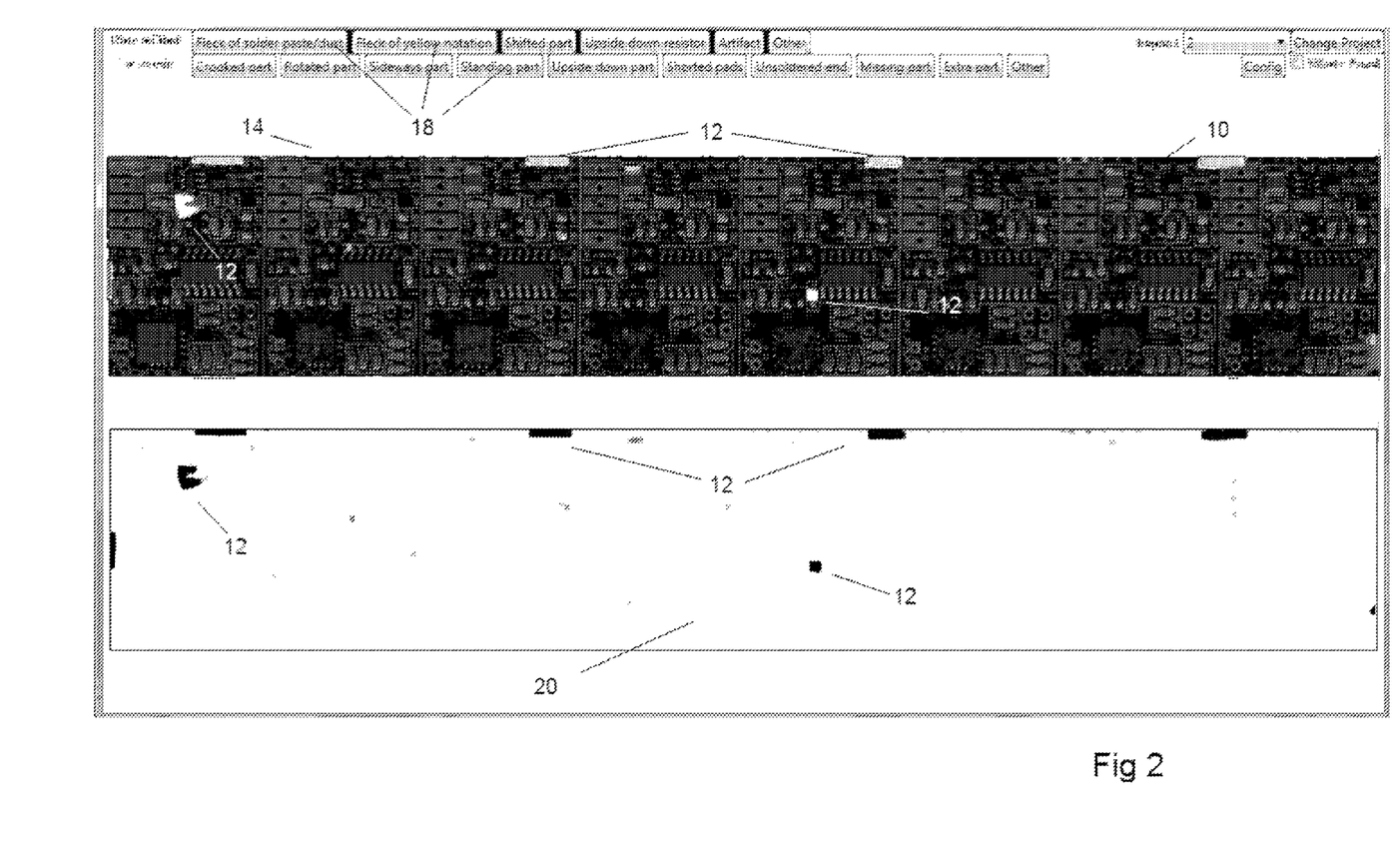
FIG. 2 is a view of the image of the circuit board to which the overlay image of the present invention has been applied, along with a separated view of the overlay image in an inverted form.
Figure 3:
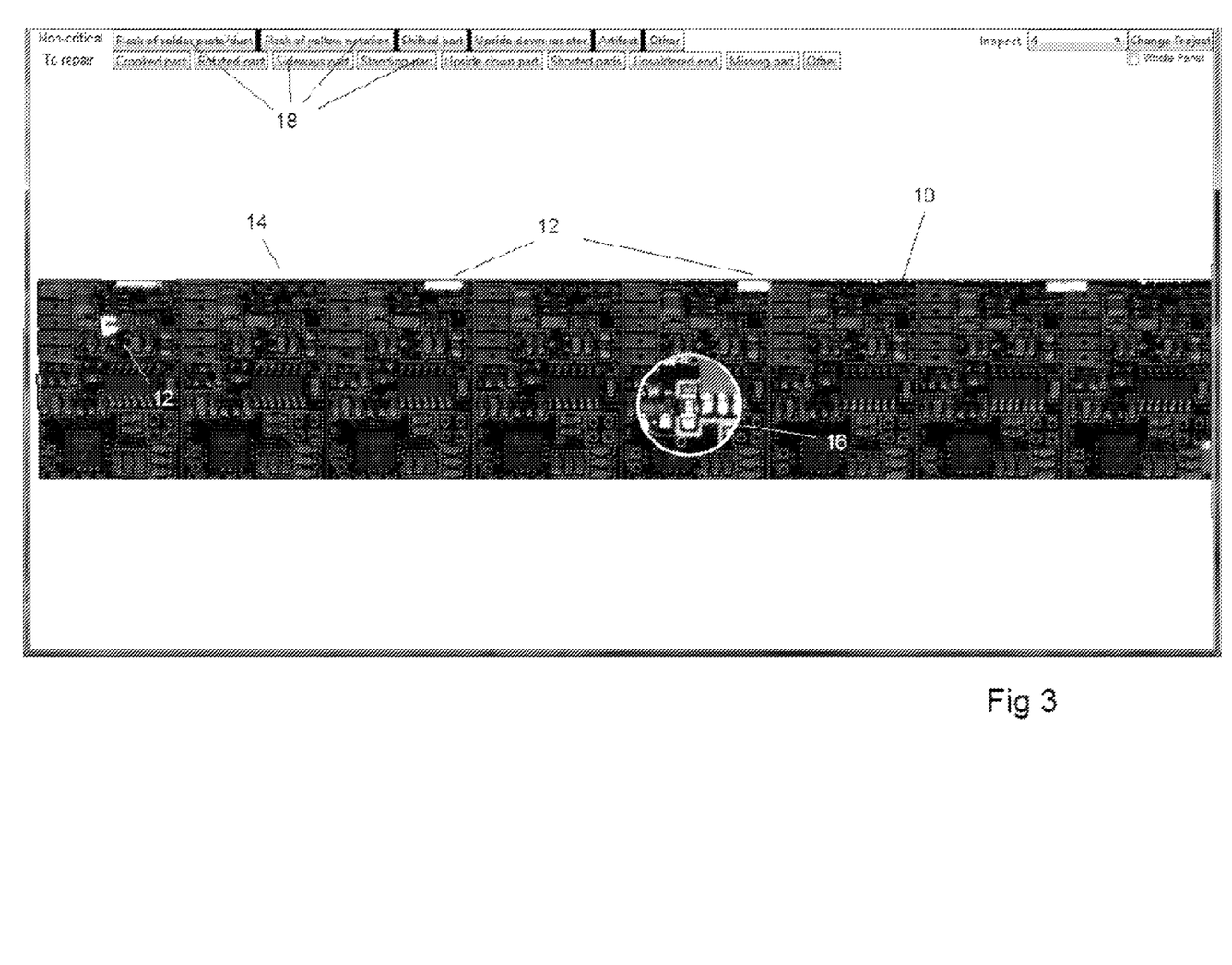
FIG. 3 is a view of the image of the circuit board and the overlay image with a fault selected for viewing.

FIG. 2 shows the resulting image of a circuit board 10 with the overlay image 20 applied. A separate display of the overlay image 20 is shown underneath the circuit board 20 in FIG. 2 with the brightness of the image segments inverted for clarity. A number of potential fault areas 12 from the overlay image 20 can be seen on the circuit board 10. As the image is in black and white, the potential fault areas 12 are seen in white. As mentioned before however, these potential fault areas 12 would preferably appear bright red on the computer display of the computing device.

The process of the invention is preferably provided by software on a computer which can be controlled by a user input device, such a keyboard or mouse. The software provides for selection of a part of the circuit board where a potential fault area 12 exists with the input device. Selection of a part of the circuit board 10 displays a zoomed display area 16 of the selected area. The overlay image 20 is removed from the zoomed display area 16 so that the components there may be viewed. In this way, the component where the method has determined a potential fault can be easily inspected.

Figure 4A:
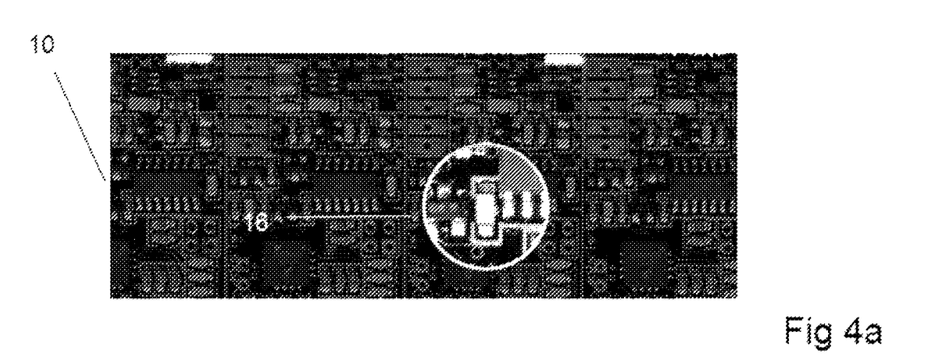
FIG. 4a is a dose up view of a first selected potential fault area on the circuit board with the overlay image removed.
Figure 4B:
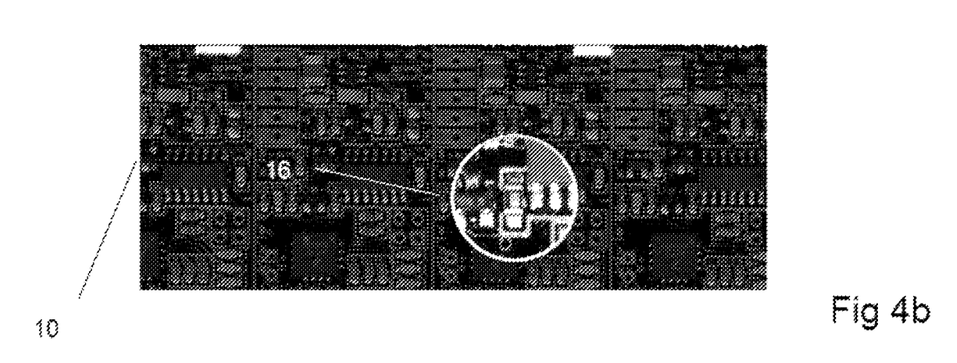
FIG. 4b is a close up view of the first selected potential fault area showing the portion of another circuit board to which the image has been compared.

The zoomed display area 16 comprises an image which alternates between displaying the circuit board 10 and displaying an image of a corresponding part of another circuit board 10 determined to be suitable for comparison. The other circuit board 10 may be, for example, a known good board. FIG. 4a shows the zoomed display area 16 displaying the components of the selected circuit board 10 and FIG. 4b shows the zoomed display area 16 showing an image of another circuit board 10. The differences between the images can then be easily compared to identify whether a fault exists and the nature of the fault. In the case shown, the component is upside down.

Figure 5A:
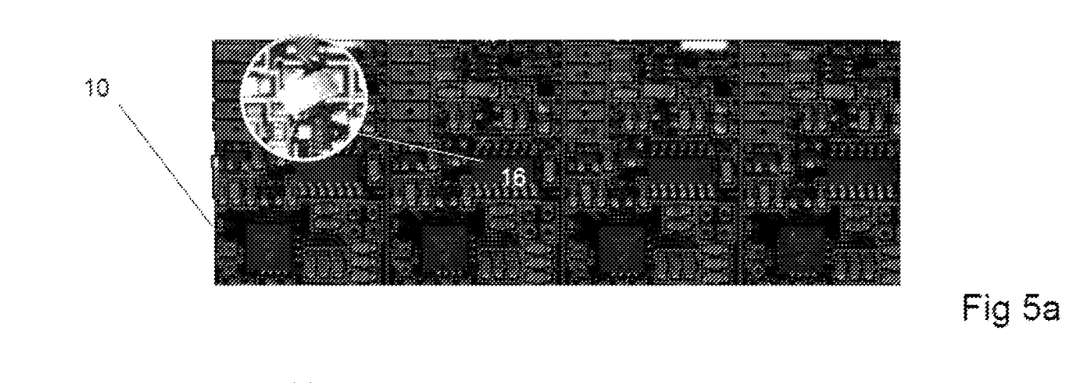
FIG. 5a is a close up view of a second selected potential fault area on the circuit board with the overlay image removed.
Figure 5B:
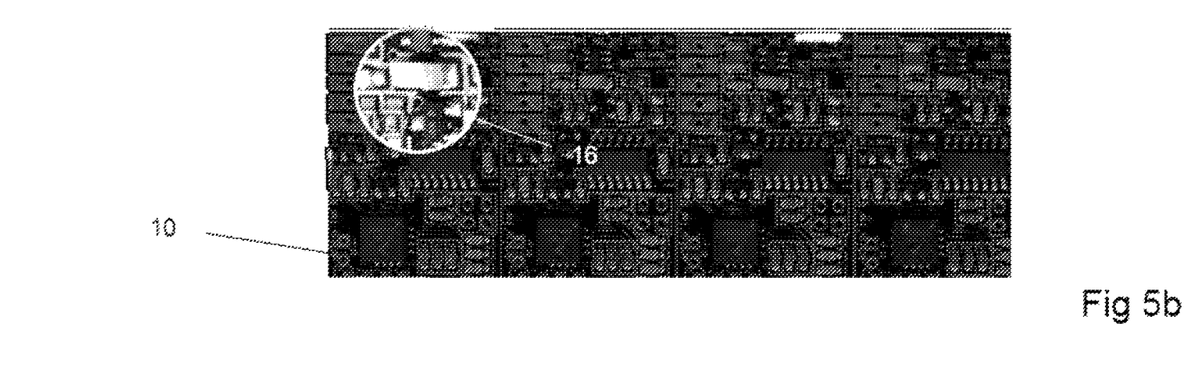
FIG. 5b is a close up view of the second selected potential fault area showing the portion of the other circuit board to which the image has been compared.

FIGS. 5a and 5b show similar images of another potential fault area 12 from the circuit board 10. In this instance, it can easily be seen that there is a rotated component.

Figure 6:
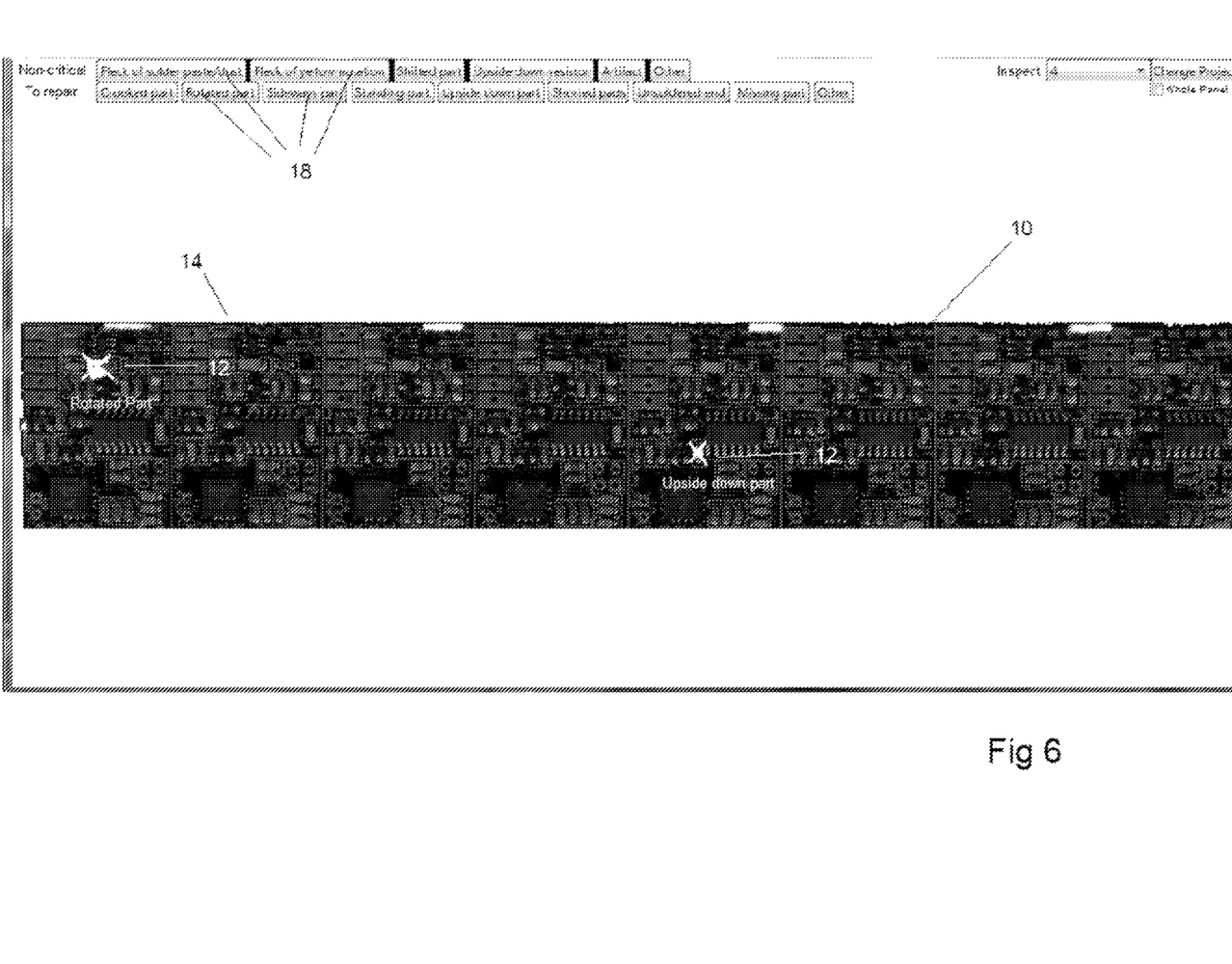
FIG. 6 is a view of the circuit board showing the marking of fault categories.

The software preferably displays one or more controls which may be operated to place annotation on the image indicating the type of potential fault found. The controls in the embodiment shown comprise marking buttons 18. These annotations may provide for indications of critical conditions such as missing parts, rotated parts, upside down parts or unsoldered parts. The annotations may also provide for indications of non-critical conditions such as flecks of dust or solder paste, a shifted part or an upside down resistor. FIG. 6 shows an image of the circuit board 10 with annotation applied.

While it has been mentioned that the image characteristic value may be brightness of the pixels, other image characteristic values may be used, such as colour channel values.

It will be readily apparent to persons skilled in the relevant arts that various modifications and improvements may be made to the foregoing embodiments, in addition to those already described, without departing from the basic inventive concepts of the present invention.

What is claimed is:

1. A method of detection of faults on circuit boards comprising the steps of:
   capturing an image of each of a plurality of circuit boards;
   dividing each of the captured images into a plurality of image segments;
   defining an image characteristic value for each image segment;
   selecting one of the circuit boards for testing;
   comparing each image segment from the selected circuit board with corresponding image segments of each other circuit board and defining for each image segment a plurality of differential image characteristic values, each being the difference between the image characteristic value of the image segment of the selected circuit board and the image characteristic value of one of the other circuit boards;
   ranking sortie or all of the differential image characteristic values for each image segment from lowest to highest;
   selecting an $n^{th}$ differential image characteristic value for each image segment; and
   creating a map from the selected differential image characteristic values providing, information about locations on the circuit board where faults may exist.

2. The method of detection of faults on circuit boards in accordance with claim 1, further comprising the steps of:
   forming an overlay image from the map, the overlay image comprising a representation of the selected differential image characteristic values of each of the image segments; and
   displaying the selected circuit board overlaid with the overlay image.

3. The method of detection of faults on circuit boards in accordance with claim 2, comprising the step of selecting the $n^{th}$ differential image to be greater than the first differential image characteristic value.

4. The method of detection of faults on circuit boards in accordance with claim 3, wherein the image segments comprise pixels or blocks of a plurality of pixels of the image.

5. The method of detection of faults on circuit boards in accordance with claim 4, wherein the image characteristic value comprises the brightness of the image segment.

6. The method of detection of faults on circuit boards in accordance with claim 5, wherein the number of differential image characteristic values ranked is less than the number of circuit boards.

7. The method of detection of faults on circuit boards in accordance with claim 6, wherein the overlay image is formed of image segments of a selected color wherein the intensity of each segment is related to the corresponding differential image characteristic value.

8. The method of detection of faults on circuit boards in accordance with claim 7, wherein the overlay image is modified to reduce the intensity in areas where only a small number of image segments are visible.

9. The method of detection of faults on circuit boards in accordance with claim 8, wherein the overlay image is blurred.

10. The method of detection of faults on circuit boards in accordance with claim 9, wherein image segments of the overlay image are expanded after blurring to increase the visibility of visible image segments.

11. The method of detection of faults on circuit boards in accordance with claim 10, wherein an image alignment procedure is utilized in order to align each part of the captured image of a circuit board with corresponding parts of the other images before determination of the differential image characteristic values.

12. The method of detection of faults on circuit boards in accordance with claim 11, wherein the image alignment procedure for each circuit board comprises comparing the image against a pre-selected image of a circuit board of the same type, moving the image through a plurality of positions and comparing to the pre-selected image each time until a position is determined in which the image is most similar to the pre-selected image.

13. The method of detection of faults on circuit boards in accordance with claim 12, wherein the image is further divided into a plurality of sub-portions corresponding to sub-portions of the preselected image and for each sub-portion, the image alignment procedure is repeated.

14. The method of detection of faults on circuit boards in accordance with claim 13, the method of the invention is performed by software on a computer having a display and a user input device.

15. The method of detection of faults on circuit boards in accordance with claim 14, wherein the software provides for selection of a part of the circuit board where a potential fault area exists with the input device to display a zoomed display area in which the overlay image is removed.

16. The method of detection of faults on circuit boards in accordance with claim 15, wherein the zoomed display area comprises an image which alternates between displaying the circuit board and displaying an image of a corresponding part of another circuit board.

17. The method of detection of faults on circuit boards in accordance with claim 16, wherein the software provides one or more controls which can be operated by the user to annotate potential fault areas.

18. The method of detection of faults on circuit boards in accordance with claim 17, wherein the annotations may comprise critical and non-critical faults.

19. The method of detection of faults on circuit boards in accordance with claim 1, wherein an image alignment procedure is utilized in order to align each part of the captured image of a circuit board with corresponding, parts of the other images before determination of the differential image characteristic values.

20. The method of detection of faults on circuit boards in accordance with claim 1, wherein the number of differential image characteristic values ranked is less than the number of circuit boards.

* * * * *